(12) United States Patent
Liu et al.

(10) Patent No.: US 7,537,346 B2
(45) Date of Patent: *May 26, 2009

(54) DISPLAY HAVING INTEGRATED LIGHT EMITTING MATERIAL

(75) Inventors: Jian-Qiang Liu, Campbell, CA (US);
Xiao-Dong Sun, Fremont, CA (US);
Ming-Heo Duan, San Gabriel, CA (US)

(73) Assignee: Superimaging, Inc., Fremont, CA (US)

( * ) Notice: Subject to any disclaimer, the term of this patent is extended or adjusted under 35 U.S.C. 154(b) by 80 days.

This patent is subject to a terminal disclaimer.

(21) Appl. No.: 11/367,285

(22) Filed: Mar. 3, 2006

(65) Prior Publication Data

US 2006/0197922 A1    Sep. 7, 2006

Related U.S. Application Data

(60) Provisional application No. 60/658,242, filed on Mar. 3, 2005.

(51) Int. Cl.
G03B 21/56 (2006.01)

(52) U.S. Cl. .............................. 353/31; 353/79; 359/452

(58) Field of Classification Search .................... 353/31, 353/34, 37, 79, 84; 359/443, 452, 460
See application file for complete search history.

(56) References Cited

U.S. PATENT DOCUMENTS

| | | | |
|---|---|---|---|
| 3,598,995 A | 8/1971 | Inoue et al. | |
| 3,881,800 A | 5/1975 | Friesem | |
| 3,953,117 A | 4/1976 | Cannon | |
| 4,158,210 A | 6/1979 | Watanabe et al. | |
| 4,689,522 A | 8/1987 | Robertson | |
| 4,713,577 A | 12/1987 | Gualtieri et al. | |
| 4,814,666 A | 3/1989 | Iwasaki et al. | |
| 4,960,314 A | 10/1990 | Smith et al. | |
| 4,989,956 A | 2/1991 | Wu et al. | |
| 5,045,706 A | 9/1991 | Tanaka et al. | |
| 5,078,462 A | 1/1992 | Gravisse | |
| 5,142,387 A | 8/1992 | Shikama et al. | |
| 5,162,160 A | 11/1992 | Matsui et al. | |

(Continued)

FOREIGN PATENT DOCUMENTS

DE    10350529 A1    3/2005

(Continued)

OTHER PUBLICATIONS

"Handbook of Plastics, Elastomers, and Composites" Harper, C. McGraw-Hill, 3rd Ed (1996).

(Continued)

*Primary Examiner*—William C Dowling
(74) *Attorney, Agent, or Firm*—Sherr & Vaughn, PLLC (57) ABSTRACT

Viewable images may be displayed from a substantially dark substrate. Light emitting material may be integrated into a substantially dark substrate. The light emitting material may be configured to emit visible light in response to absorption of ultraviolet light. The light emitting material may include a plurality of light emitting particles and each of the plurality of light emitting particles has a diameter less than about 500 nanometers. For example, emitting visible light from a substantially dark substrate may allow for images to be displayed with relatively high contrast. These high contrast images may appear clearer to a viewer and may result in less eye strain by a viewer.

44 Claims, 7 Drawing Sheets

U.S. PATENT DOCUMENTS

| | | | |
|---|---|---|---|
| 5,233,197 A | 8/1993 | Bowman et al. | |
| 5,289,315 A | 2/1994 | Makita et al. | |
| 5,347,644 A | 9/1994 | Sedlmayr | |
| 5,424,535 A | 6/1995 | Albion et al. | |
| 5,473,396 A | 12/1995 | Okajima et al. | |
| 5,566,025 A | 10/1996 | Knoll et al. | |
| 5,646,479 A | 7/1997 | Troxell | |
| 5,684,621 A | 11/1997 | Downing | |
| 5,764,403 A | 6/1998 | Downing | |
| 5,784,162 A | 7/1998 | Cabib et al. | |
| 5,786,582 A | 7/1998 | Roustaei et al. | |
| 5,914,807 A | 6/1999 | Downing | |
| 5,921,650 A | 7/1999 | Doany et al. | |
| 5,943,160 A | 8/1999 | Downing | |
| 5,956,172 A | 9/1999 | Downing | |
| 5,957,560 A | 9/1999 | Do et al. | |
| 6,064,521 A | 5/2000 | Burke | |
| 6,128,131 A | 10/2000 | Tang | |
| 6,166,852 A | 12/2000 | Miro | |
| 6,204,971 B1 * | 3/2001 | Morris et al. | 359/619 |
| 6,221,112 B1 | 4/2001 | Snider | |
| 6,239,907 B1 | 5/2001 | Allen et al. | |
| 6,261,402 B1 | 7/2001 | Watanabe et al. | |
| 6,327,074 B1 | 12/2001 | Bass et al. | |
| 6,337,769 B1 | 1/2002 | Lee | |
| 6,381,068 B1 | 4/2002 | Harada et al. | |
| 6,439,888 B1 | 8/2002 | Boutoussov et al. | |
| 6,466,184 B1 | 10/2002 | Whitesell et al. | |
| 6,501,590 B2 | 12/2002 | Bass et al. | |
| 6,507,436 B2 | 1/2003 | Nishikawa et al. | |
| 6,654,161 B2 | 11/2003 | Bass et al. | |
| 6,769,773 B1 | 8/2004 | Wu | |
| 6,804,053 B2 | 10/2004 | Etori et al. | |
| 6,809,781 B2 | 10/2004 | Setlur et al. | |
| 6,844,950 B2 | 1/2005 | Ja Chisholm et al. | |
| 6,870,671 B2 | 3/2005 | Travis | |
| 6,897,999 B1 | 5/2005 | Bass et al. | |
| 6,986,581 B2 * | 1/2006 | Sun et al. | 353/31 |
| 7,040,764 B2 * | 5/2006 | Przybyla et al. | 353/84 |
| 7,213,923 B2 * | 5/2007 | Liu et al. | 353/31 |
| 2001/0005282 A1 | 6/2001 | Etori et al. | |
| 2002/0024495 A1 | 2/2002 | Lippert et al. | |
| 2002/0048058 A1 | 4/2002 | Nishikawa et al. | |
| 2002/0080482 A1 | 6/2002 | Watanabe et al. | |
| 2002/0088925 A1 | 7/2002 | Nestorovic et al. | |
| 2002/0120916 A1 | 8/2002 | Snider, Jr. | |
| 2002/0140338 A1 | 10/2002 | Sluzky | |
| 2002/0190224 A1 | 12/2002 | Tazaki | |
| 2003/0002153 A1 | 1/2003 | Hiraishi et al. | |
| 2003/0198456 A1 | 10/2003 | Steiner et al. | |
| 2003/0213967 A1 | 11/2003 | Forrest et al. | |
| 2003/0214724 A1 | 11/2003 | Fujikawa et al. | |
| 2003/0227004 A1 | 12/2003 | Dopps | |
| 2004/0022071 A1 | 2/2004 | Cheng et al. | |
| 2004/0041988 A1 | 3/2004 | Kitamura | |
| 2004/0070551 A1 | 4/2004 | Walck et al. | |
| 2004/0070824 A1 | 4/2004 | Toda et al. | |
| 2004/0090794 A1 | 5/2004 | Ollett et al. | |
| 2004/0100692 A1 | 5/2004 | Hou | |
| 2004/0114219 A1 | 6/2004 | Richardson | |
| 2004/0135976 A1 | 7/2004 | Ishihara et al. | |
| 2004/0149998 A1 | 8/2004 | Henson et al. | |
| 2004/0164669 A1 | 8/2004 | Kawaguchi et al. | |
| 2004/0224154 A1 | 11/2004 | Toda et al. | |
| 2004/0233526 A1 | 11/2004 | Kaminsky et al. | |
| 2004/0257650 A1 | 12/2004 | Parusel et al. | |
| 2005/0030617 A1 | 2/2005 | Umeya | |
| 2005/0063054 A1 | 3/2005 | Umeya | |
| 2005/0088736 A1 | 4/2005 | Ghozeil et al. | |
| 2005/0088737 A1 | 4/2005 | Piehl | |
| 2005/0152032 A1 | 7/2005 | Olofson et al. | |
| 2005/0174635 A1 | 8/2005 | Bruegl et al. | |

FOREIGN PATENT DOCUMENTS

| | | |
|---|---|---|
| JP | 4281422 | 10/1992 |

OTHER PUBLICATIONS

Xiao-Dong (Ted) Sun, etc. Identification and optimization of advanced phosphors using combinatorial libraries Appl. Phys. Lett., vol. 70, No. 25, Jun 23, 1997.

"A Three-Color, Solid-State, Three Dimensional Display", E. Downing et al, Science vol. 273, pp. 1185-1189, 1996.

J. Lewis et al., "A True Three-Dimensional Display", IEEE Trans Election Devices vol. 18 pp. 724,1971.

Murray, "Head-up displays get second glance", EE Times, Jan. 5, 2004.

E-Window Product Web Page. www.nano-proprietary.com.

Rockwell Collins Product Web Page, Head Up Displays (HUDs), www.rockwellcollins.com.

Steigerwald et al., "Illumination With Solid State Lighting Technology", IEEE Journal on Selected Topics in Quantum Electronics, Mar. 2002, vol. 8, No. 2.

Jeon et al. "A novel fabrication method for a 64 x 64 matrix-addressable GaN-based micro-LED array", Phys. Stat. Sol. (a) 200, No. 1, pp. 79-82 (2003).

Hawkyard, "The release of disperse dyes from Thickner Films during thermal processes" Journal of the society of dyes and colourists, vol. 97 (1981) 213-219.

ProScreeninc Product Web Page, "Airshow", www.proscreeninc.com.

Smart Motorist Product Web Page, "Distracted Drivers Cause Motor Vehicle Accidents", www.smartmotorist.com.

Iwaya, et al., "High Power UV-Light-Emitting Diode on Sapphire", Jpn. J. Appl. Phys. vol. 42(2003) pp. 400-403.

Coosemans et al., "MT-compatible connectorisation of VCSEL and RCLED arrays to plastic . . . datalinks", Materials Science In Semiconductor Processing, vol. 3 (2000) pp. 475-480.

* cited by examiner

DISPLAY HAVING INTEGRATED LIGHT EMITTING MATERIAL

Priority is claimed to U.S. Provisional Patent Application No. 60/658,242, filed in the U.S. Patent and Trademark Office on Mar. 3, 2005, which is hereby incorporated by reference in entirety.

BACKGROUND

The reproduction of images has had a positive effect on many people's lives. One of the earliest technologies for reproducing images was the movie projector, which allowed for audiences to view theatrical productions without live actors and actresses. Televisions were invented, which allowed people to watch moving pictures in the comfort of their own homes. The first televisions were cathode ray tube (CRT) televisions, which is a technology that is still being used today. During the computer age, it has been desirable to reproduce images which are output from computers through monitors. Like many televisions, many computer monitors use CRT technology.

Other technologies have been developed as substitutes for CRT technology. For example, liquid crystal display (LCD) technology is commonplace for both computer monitors and televisions. A LCD is a relatively thin display, which is convenient for many people. Other examples of displays are plasma displays, rear projections displays, and projectors. As display technology has improved, many new applications are being developed. For example, many attempts have been made to develop displays with relatively high contrast images. However, there have been many technical challenges that have prevented optimization of image contrast. Specifically, it has been difficult to minimize the amount of broadband light emitted or reflected from a display, which may detract from the contrast of the image displayed.

SUMMARY

In accordance with embodiments, viewable images can be displayed from a substantially dark substrate. In embodiments, light emitting material is integrated into a substantially dark substrate. The light emitting material is configured to emit visible light in response to absorption of ultraviolet light. The light emitting material comprises a plurality of light emitting particles and each of the plurality of light emitting particles has a diameter less than about 500 nanometers. For example, emitting visible light from a substantially dark substrate may allow for images to be displayed with relatively high contrast. These high contrast images may appear clearer to a viewer and may result in less eye strain by a viewer.

DESCRIPTION

Figure 1:
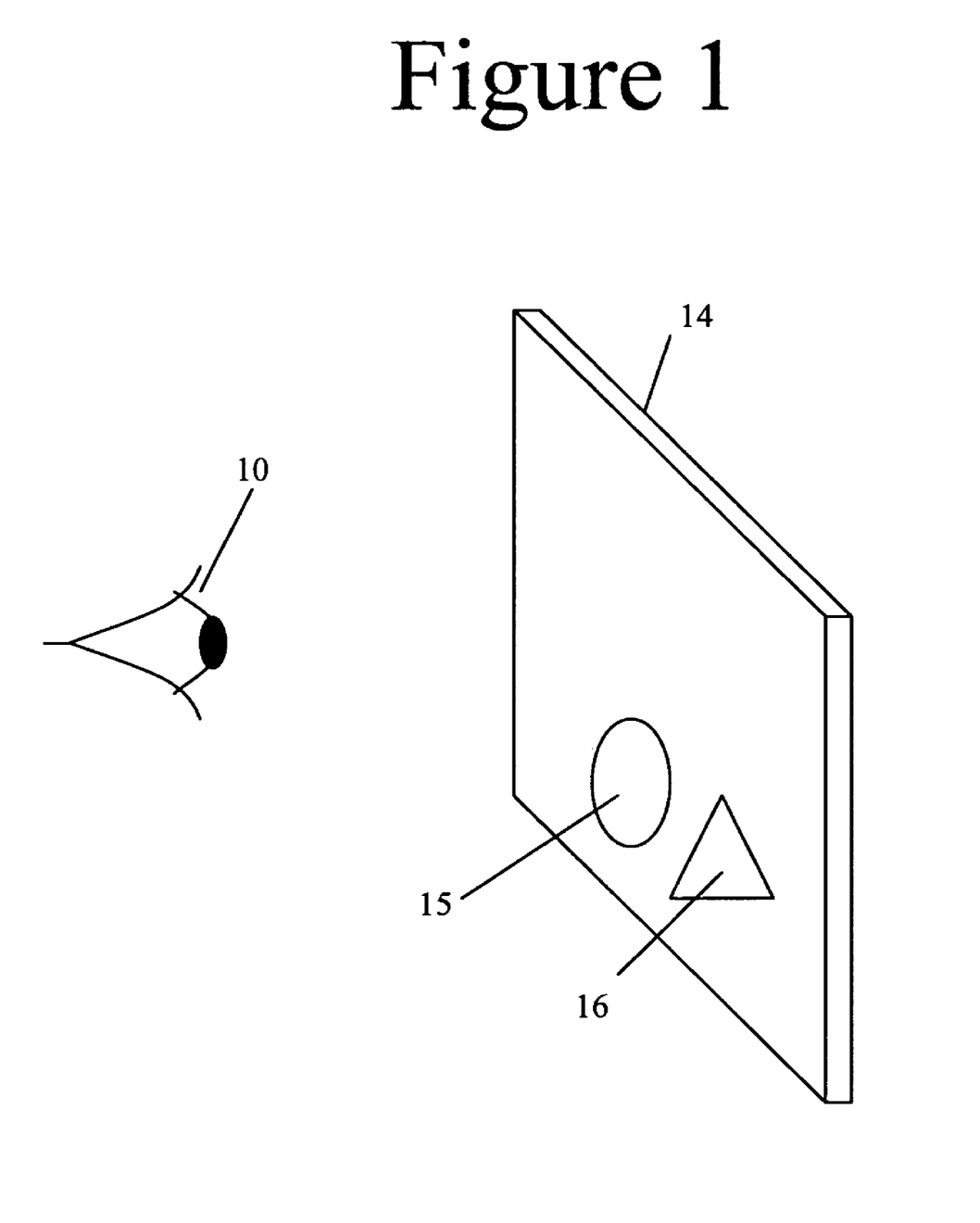
FIG. 1 is an example diagram of a display with images being emitted from a substantially dark substrate.

FIG. 1 is an example diagram of a display, in accordance with embodiments. Substrate 14 may be a substantially dark substrate. Viewer 10 sees images (e.g. circle 15 and triangle 16) that are created at substrate 14. Substrate 14 may be part of a front projection or rear projection display.

Figure 2:
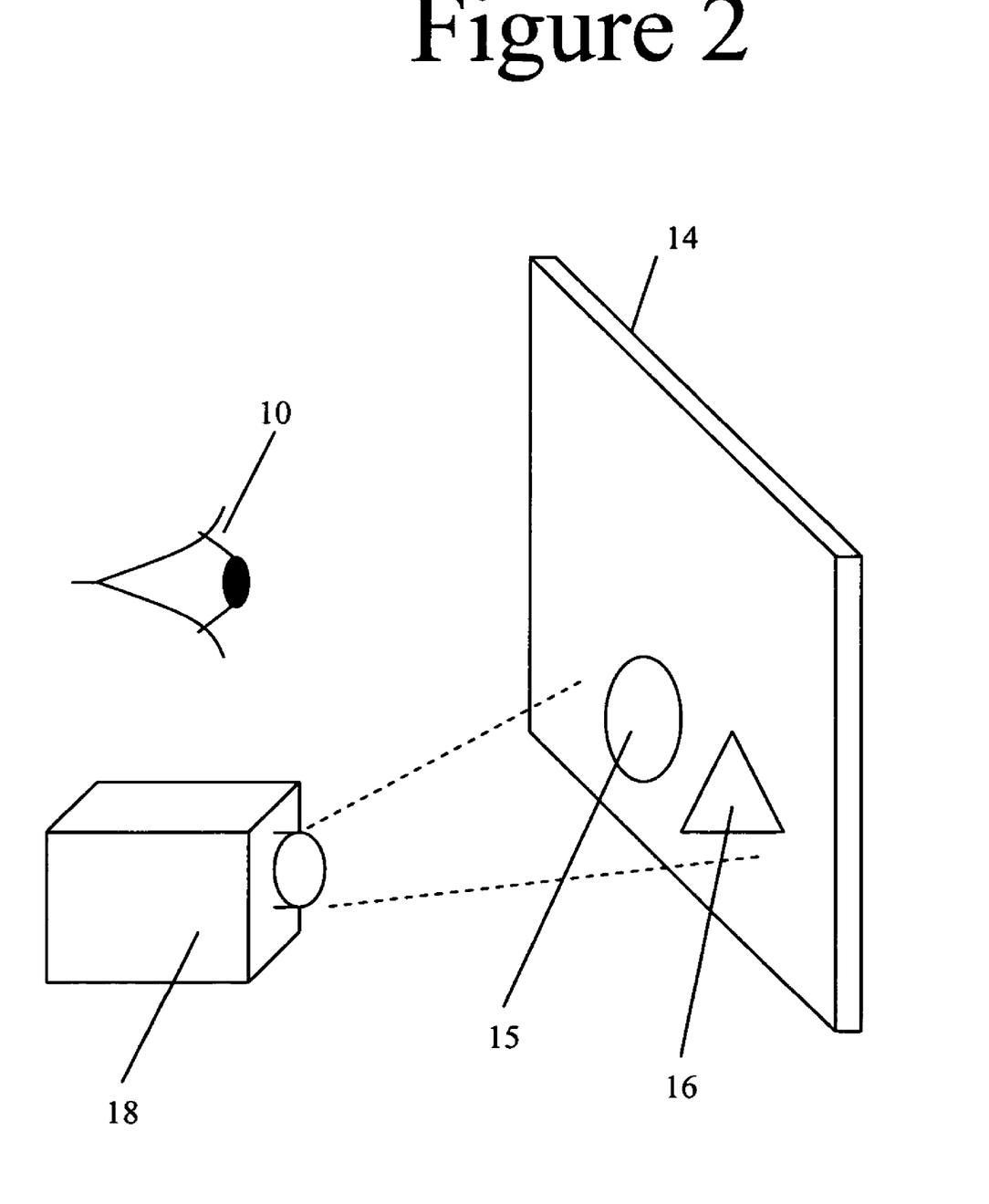
FIG. 2 is an example diagram of a front projection display illuminated with excitation light from a light source.
Figure 3:
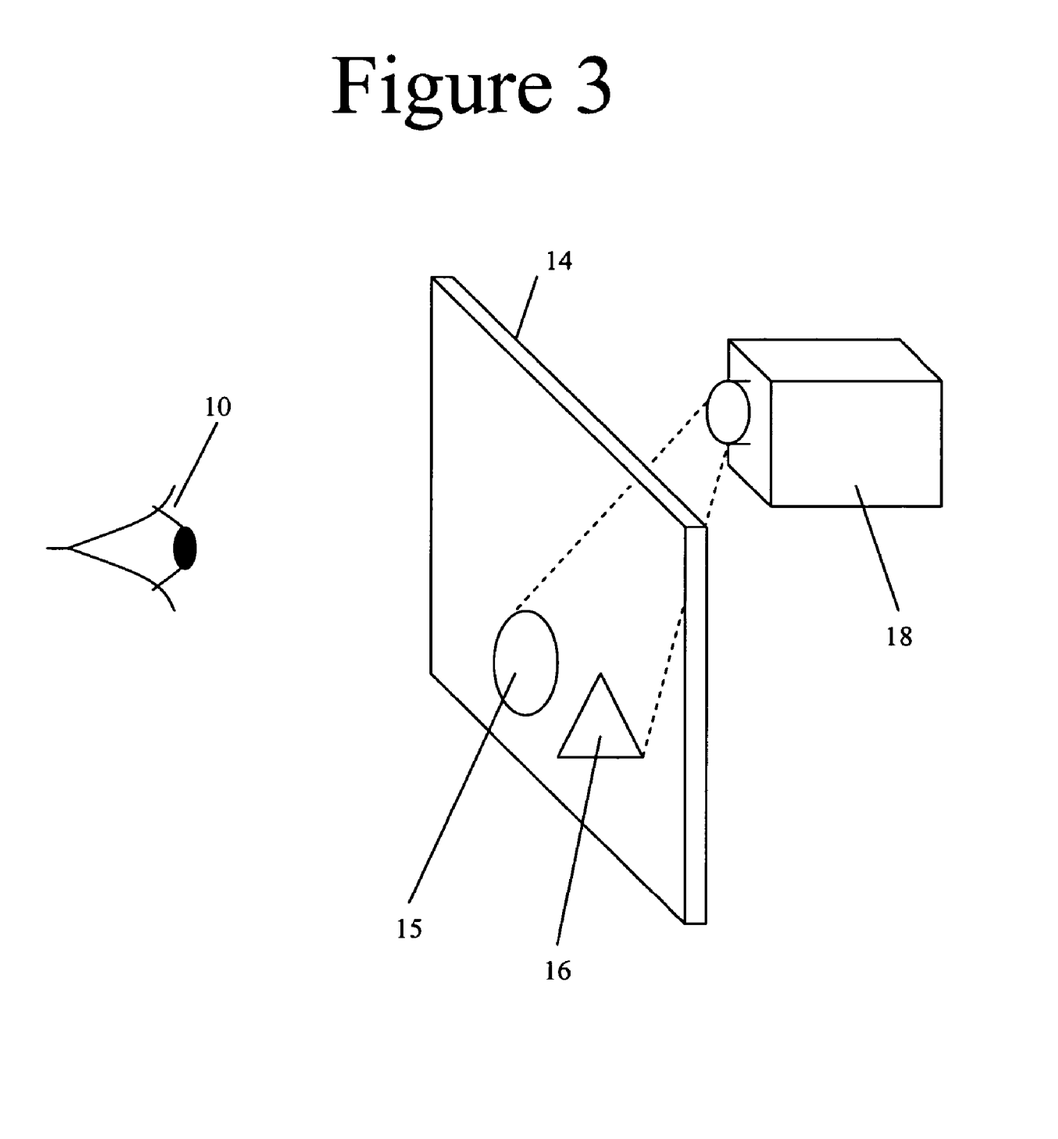
FIG. 3 is an example diagram of a rear projection display illuminated with excitation light from a light source.

FIGS. 2 and 3 are example diagrams of transparent displays illuminated with excitation light (e.g. ultraviolet light or infrared light) from a light source 18 (e.g. projector, LED array, laser, or other light source that emits ultraviolet or infrared light), in accordance with embodiments. Substrate 14 may receive excitation light from a light source 18. The received excitation light may be absorbed by light emitting material at substrate 14. When the light emitting material receives the excitation light, the light emitting material may emit visible light. Accordingly, images (e.g. circle 15 and triangle 16) may be created at substrate 14 by selectively illuminating substrate 14 with excitation light.

The excitation light may be ultraviolet light, in accordance with embodiments of the present invention. If the excitation light is ultraviolet light, then when the light emitting material emits visible light in response to the ultraviolet light, a down-conversion physical phenomenon occurs. Specifically, ultraviolet light has a shorter wavelength and higher energy than visible light. Accordingly, when the light emitting material absorbs the ultraviolet light and emits lower energy visible light, the ultraviolet light is down-converted to visible light because the ultraviolet light's energy level goes down when it is converted into visible light. In embodiments, the light emitting material is fluorescent material.

The excitation light may be infrared light, in accordance with embodiments of the present invention. If the excitation light is infrared light, then when the light emitting material emits visible light in response to the infrared light, an up-conversion physical phenomenon occurs. Specifically, infrared light has a longer wavelength and lower energy than visible light. Accordingly, when the light emitting material absorbs the infrared light and emits higher energy visible light, the infrared light is up-converted to visible light because the infrared light's energy level goes up when it is converted into visible light. In embodiments, the light emitting material is fluorescent material. In the up-conversion physical phenomenon, absorption of more than one infrared light photon may be necessary for the emission of every visible light photon.

In embodiments illustrated in FIG. 2, excitation light is output by light source 18, with the light source projecting light from the viewer side of the substrate 14. Accordingly, the substantially dark substrate 14 may be implemented in a front projection display. In embodiments illustrated in FIG. 3, excitation light is output be light source 18, with the light source projecting light from the opposite side of substrate 14 than the viewer 10. One of ordinary skill in the art will appreciate that projection could include any transmission of light into the substrate 14, whether the light source 18 is independent of substrate 14 or integrated into substrate 14.

Light source 18 may be a digital projector. In embodiments, light source 18 is a micro-mirror array (MMA) projector (e.g. a digital light processing (DLP) projector). A MMA projector that outputs ultraviolet light may be similar to a MMA projector that outputs visible light, except that the color wheel has light filters that are tailored to the ultraviolet light spectrum. In other embodiments, the light source 18 is a liquid crystal display (LCD) projector. In embodiments, the light source 18 may be a liquid crystal on silicon (LCOS) projector. In embodiments, the light source 18 may be an analog projector (e.g. a slide film projector or a movie film projector). In embodiments, light source 18 may be a laser. In down-conversion embodiments, the output from light source 18 may be ultraviolet light. In up-conversion embodiments, the output from light source 18 may be infrared light. One of ordinary skill in the art would appreciate other types of projectors, lasers or other light radiating devices which may be used to project ultraviolet light on substrate 14.

Figure 4:
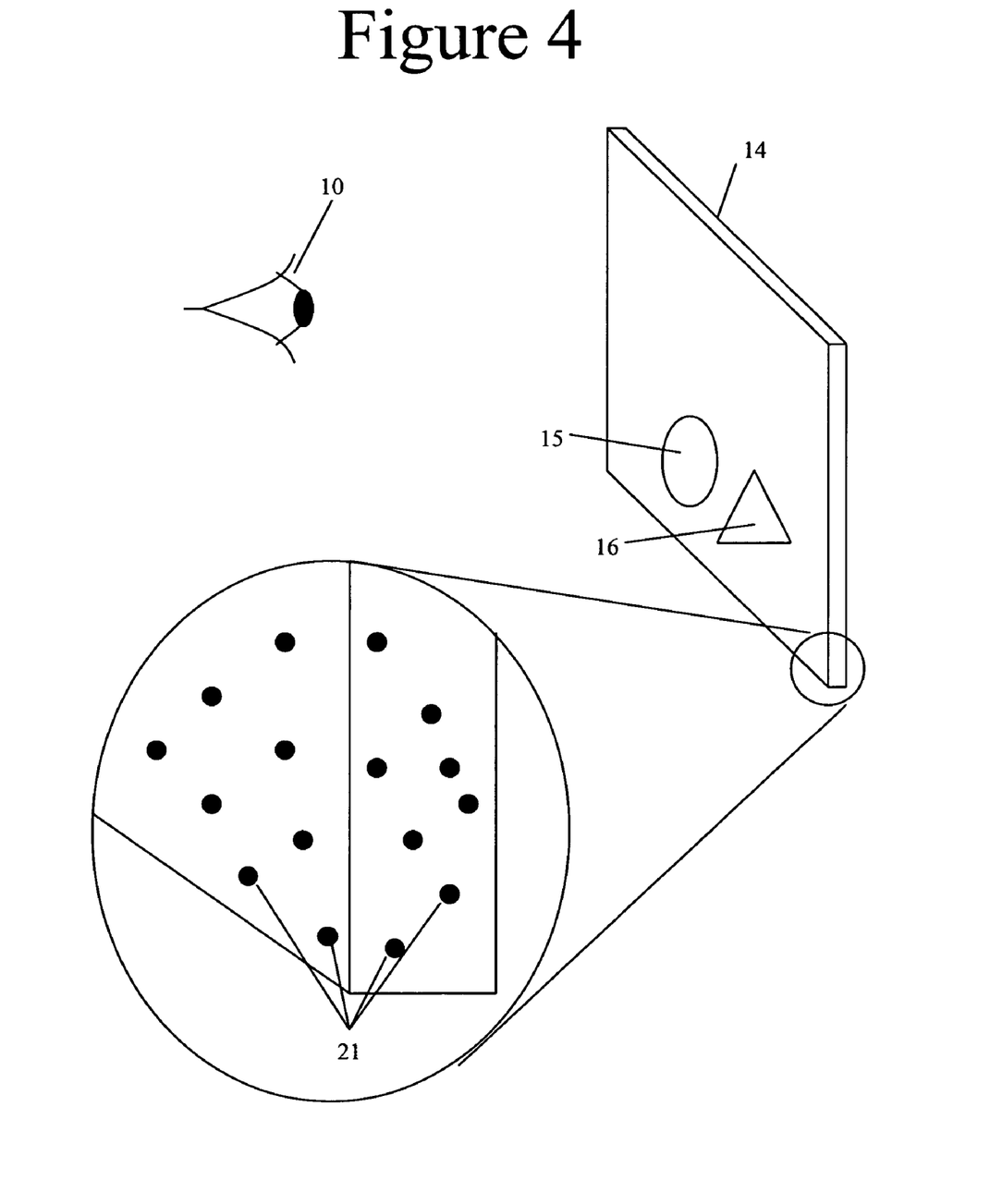
FIG. 4 is an example diagram of light emitting particles dispersed in a substantially transparent substrate.
Figure 5:
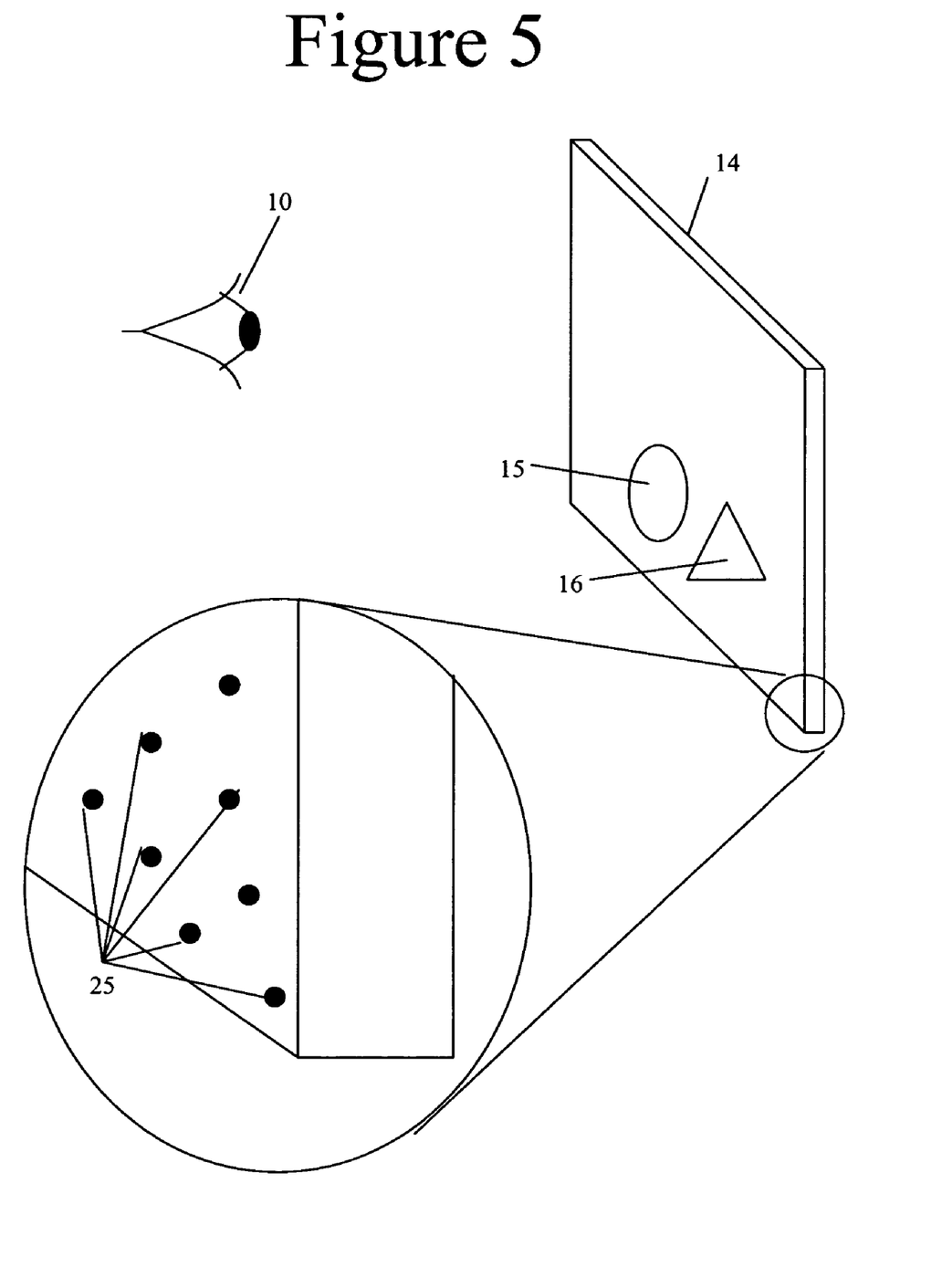
FIG. 5 is an example diagram of light emitting particles disposed on a surface of a substantially transparent substrate.

FIG. 4 is an example diagram of light emitting material (e.g. light emitting particles 21) dispersed in a substantially dark substrate, according to embodiments. When excitation light is absorbed by the light emitting particles 21, the light emitting particles emit visible light. Accordingly, in down-conversion embodiments, when ultraviolet light is absorbed by light emitting particles 21, visible light is emitted from the light emitting particles. Likewise, in up-conversion embodiments, when infrared light is absorbed by light emitting particles 21, visible light is emitted from the light emitting particles. FIG. 5 is an example diagram of light emitting particles 25 disposed on a surface of substrate 14. Light emitting particles 25 may be integrated into substrate 14 by being coated on substrate 14. In embodiments substrate 14 is a substantially homogeneous substrate with light emitting particles (e.g. particles 21 or particles 25) integrated into the substrate 14. Although substrate 14 may be substantially homogeneous, one of ordinary skill in the art will appreciate that the concentration of light emitting particles integrated into substrate 14 may be varying (e.g. concentration of particles on or near the surface of substrate 14).

Light emitting material (e.g. light emitting particles 21 and light emitting particles 25) may be fluorescent material, which emits visible light in response to absorption of electromagnetic radiation (e.g. visible light, ultraviolet light, or infrared light) that is a different wavelength than the emitted visible light. The size of the particles may be smaller than the wavelength of visible light, which may reduce or eliminate visible light scattering by the particles. Examples of particles that are smaller than the wavelength of visible light are nanoparticles or molecules. According to embodiments, each of the light emitting particles has a diameter that is less than about 500 nanometers. According to embodiments, each of the light emitting particles has a diameter that is less than about 400 nanometer. According to embodiments, each of the light emitting particles has a diameter that is less than about 300 nanometer. According to embodiments, each of the light emitting particles has a diameter that is less than about 200 nanometers. According to embodiments, each of the light emitting particles has a diameter that is less than about 100 nanometers. The light emitting particles may be individual molecules.

Different types of light emitting particles (e.g. light emitting particles 21 and light emitting particles 25) may be used together that have different physical characteristics. For example, in order to emit color images in substrate 14, different types of light emitting particles may be utilized that are associated with different colors. For example, a first type of light emitting particles may be associated with the color red, a second type of light emitting particles may be associated with the color green, and a third type of light emitting particles may be associated with the color blue. Although the example first type, second type, and third type of light emitting particles are primary colors, one of ordinary skill in the art would appreciate other combinations of colors (e.g. types of colors and number of colors) in order to facilitate a color display.

In down-conversion embodiments, light emitting particles which emit red light may include Europium, light emitting particles which emit green light may include Terbium, and light emitting particles which emit blue or yellow light may include Cerium (and/or Thulium). In up-conversion embodiments, light emitting particles which emit red light may include Praseodymium, light emitting particles which emit green light may include Erbium, and light emitting particles which emit blue light may include Thulium. In embodiments, light emitting particles are fluorescent molecules that emit different colors (e.g. red, green, and blue). In embodiments, light emitting particles are included in pure organic or organo-metallic dyes.

Different types of light emitting particles may absorb different ranges of excitation light to emit the different colors. Accordingly, the wavelength range of the excitation light may be modulated in order to control the visible color emitted from the light emitting particles in substrate 14. In embodiments, different types of light emitting particles may be mixed together and integrated into substrate 14. By modulating the wavelength of the excitation light, along with spatial modulation and intensity modulation of the excitation light, visible light with specific color characteristics can be created in substrate 14. For example, by selectively exciting specific combinations of different types of light emitting particles associated with primary colors, virtually any visible color can be emitted from substrate 14.

In DLP projector embodiments, the wavelength of ultraviolet light emitted from a DLP projector can be modulated using a color wheel with specific ultraviolet pass filters. Similar modulation techniques may be utilized in other projector embodiments and laser embodiments. In embodiments, multiple projectors and multiple lasers may be utilized, each being associated with a specific ultraviolet wavelength range to excite a specific type of light emitting particle, to output a specific color of light.

Figure 6:
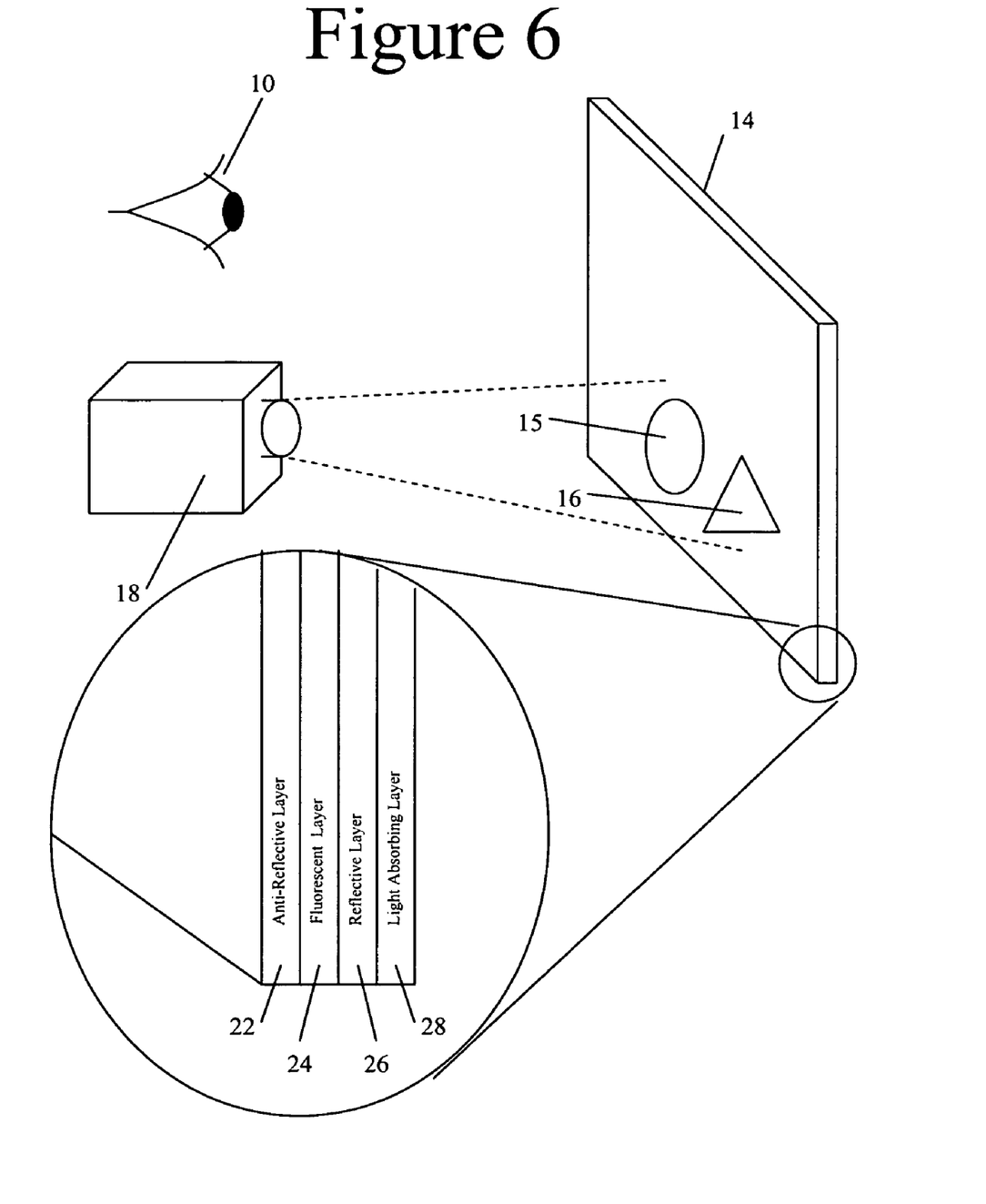
FIG. 6 is an example diagram of a display with an anti-reflective layer, a fluorescent layer, a reflective layer, and a light absorbing layer.

FIG. 6 is an example diagram of a display with anti-reflective layer 22, fluorescent layer 24, reflective layer 26, and light absorbing layer 28, in accordance with embodiments. The substantially dark substrate 14 depicted in FIG. 6 may be used in a front projection display. Light absorbing layer 28 may allow for high contrast images by minimizing broadband light emissions or reflections. Reflective layer 26 may compensate for different visible color emissions based on different material properties. Fluorescent layer 24 may provide for visible light emission in response to absorption of ultraviolet light. Anti-reflective layer 22 may reduce glare on a display and provide for higher efficiency of light emission. In embodiments, the substantially dark substrate 14 illustrated in FIG. 6 may be utilized in a front projection display. However, one of ordinary skill in the art would appreciate that the substantially dark substrate 14 illustrated in FIG. 6 may also be utilized in a rear projection display.

In embodiments, the substantially dark substrate 14 may include anti-reflective layer 22. Anti-reflective layer 22 may be a broadband (e.g. visible and ultraviolet light) anti-reflective layer, a visible light reflective layer, or an ultra-violet light anti-reflective layer. In front projection display embodiments, anti-reflective layer 22 (e.g. broadband anti-reflective layer or visible light anti-reflective layer) may be used to reduce glare on a display seen by viewer 10. Reduced glare will allow for images to be displayed more clearly on substantially dark substrate 14. In front projection display embodiments, anti- reflective layer 22 (e.g. broadband anti-reflective layer or ultraviolet light anti-reflective layer) may be used to maximize the absorption of ultraviolet light by the light emitting materials (e.g. in fluorescent layer 24). In other words, anti-reflective layer 22 will reduce the amount of ultraviolet light that is reflected off of substantially dark substrate 14, which increases the amount of ultraviolet light that is transmitted into fluorescent layer 24 (which includes light emitting material).

In embodiments, fluorescent layer 24 includes light emitting material. The light emitting material may emit visible light in response to absorption of excitation light (e.g. ultraviolet light).

In embodiments, reflective layer 26 may reflect light. In embodiments, reflective layer 26 is a selective waveband reflective layer. A selective waveband reflective layer may compensate for varying emission efficiencies of different light emitting materials. For example, if light emitting materials that emit red light emit light at a higher intensity than light emitting materials that emit blue light, a selective waveband reflective layer may compensate for these differences in emission efficiencies. For example, reflective layer 26 may reflect blue light with a higher intensity than reflective layer 26 reflects red light. Likewise, reflective layer 26 may reflect the wavelengths of ultraviolet light that cause emission of blue light with a higher intensity than reflective layer 26 reflects red light.

In embodiments, light absorbing layer 28 may absorb light to maximize the contrast of an image (e.g. circle 15 and triangle 16) seen by a viewer 10. By absorbing visible light, less broadband light is emitted or reflected from the substantially dark substrate, thus maximizing contrast. In embodiments, light absorbing layer 28 may be transparent to ultraviolet light, but substantially absorbs visible light. In embodiments, light absorbing layer 28 absorbs both visible light and ultraviolet light.

Figure 7:
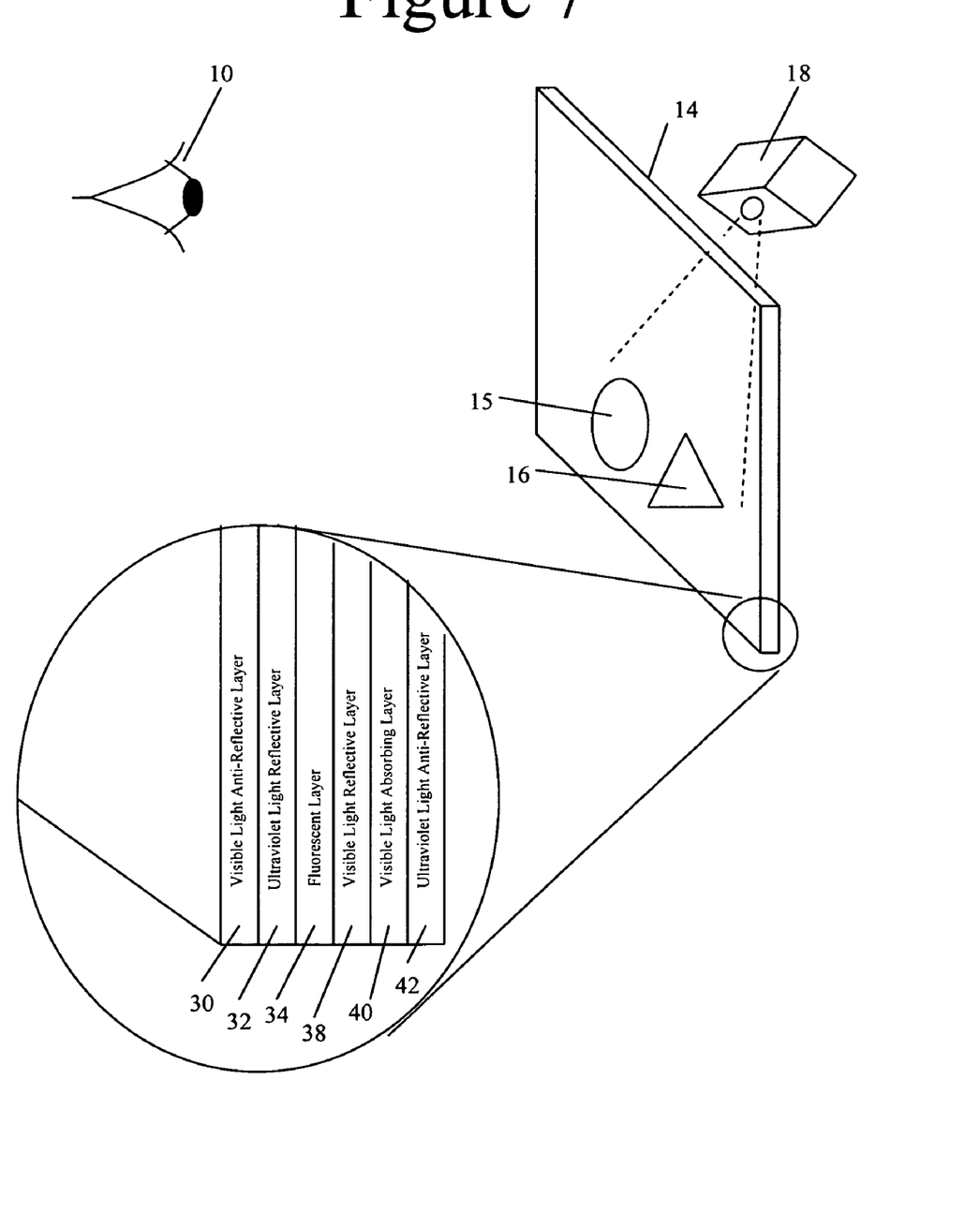
FIG. 7 is an example diagram of a display with a visible light anti-reflective layer, fluorescent layer, visible light reflective layer, visible light absorbing layer, and an ultraviolet light anti-reflective layer.

FIG. 7 is an example diagram of a display with visible light anti-reflective layer 30, ultraviolet light reflective layer 32, fluorescent layer 34, visible light reflective layer 38, visible light absorbing layer 40, and ultraviolet light anti-reflective layer 42. Visible light anti-reflective layer 30 may allow for higher contrast images viewed by view 10, by reducing glare of external visible light. Ultraviolet anti-reflective layer 32 may increase the efficiency of visible light emitted from fluorescent layer 34 and improve image contrast by reducing ambient UV light. Ultraviolet anti-reflective layer 32 may compensate for different emission characteristics of different light emitting materials in fluorescent layer 34, as a selective ultraviolet light reflector. Visible light reflector layer 38 may compensate for different emission characters of different light emitting materials in fluorescent layer 34, as a selective visible light reflector. Light absorbing layer 40 may allow for high contrast images by minimizing broadband light emission or reflection. Anti-reflective layer 22 may provide for higher efficiency of visible light emission. In embodiments, the substantially dark substrate 14 illustrated in FIG. 7 may be utilized in a rear projection display. However, one of ordinary skill in the art would appreciate that the substantially dark substrate 14 illustrated in FIG. 7 may also be utilized in a front projection display.

For example, ultraviolet light is transmitted to substrate 14 by light source 18. The amount of ultraviolet light transmitted into substrate 14 is maximized by ultraviolet light anti-reflective layer 42 by reducing the amount of ultraviolet light reflected off of the back surface of substrate 14. The ultraviolet light is then transmitted through visible light absorbing layer 40 and visible light reflective layer 38 (which may both be substantially transparent to ultraviolet light) and into fluorescent layer 34. Some (or all) of the ultraviolet light may be absorbed by the light emitting particles in fluorescent layer 34, causing visible light emission out of fluorescent layer 34. Some of the ultraviolet light that was not originally absorbed in fluorescent layer 34 may be selectively reflected back into fluorescent layer 34 by ultraviolet light reflective layer 32. Visible light emitted from fluorescent layer 34 may be transmitted through ultraviolet light reflective layer 32 and visible light anti-reflective layer 30 out of the substrate 14 and toward the viewer 10. The amount of visible light emitted from fluorescent layer 34 may be increased by some visible light being selectively reflected by visible light reflective layer 38. Visible light that is not selectively reflected by visible light reflective layer 38 may be absorbed in visible light absorbing layer 40.

In embodiments, ultraviolet light reflective layer 32 and visible light reflective layer 38 may be configured to compensate for the different emission efficiencies of the different type of light emitting particles in fluorescent layer 34. In embodiments, visible light anti-reflective layer 30 may reduce glare see by viewer 10.

One of ordinary skill in the art would appreciate that the layers illustrated in FIGS. 6 and 7 may be used in different combination, including non-inclusion of layers, without departing from the spirit of embodiments. Further, it would be appreciated by one of ordinary skill in the art that any of the layers may further include additional layers. Other layers and/or substrates may be used in conjunction with the illustrated layers without departing from the scope of embodiments.

Embodiments relate to an apparatus comprising light emitting material integrated into a substantially dark substrate, wherein: (1) the light emitting material is configured to emit visible light in response to absorption of ultraviolet light; (2) the light emitting material comprises a plurality of light emitting particles; and (3) each of the plurality of light emitting particles has a diameter less than about 500 nanometers. In embodiments, the apparatus is comprised in a rear projection display. In embodiments, the apparatus is comprised in a front projection display. In embodiments: (1) the apparatus is configured to receive ultraviolet light from a light source; and (2) the light source is at least one of a micro-mirror based projector, an array of ultraviolet LEDs, and an ultraviolet laser projector.

In embodiments, the substantially dark substrate is configured to be transparent to ultraviolet light. In embodiments, the substantially dark substrate comprises at least one of: (1) a multilayer filter; (2) a single layer optical filter; and (3) particles configured to selectively absorb visible light based on energy band properties; (4). In embodiments, the substantially dark substrate comprises at least one of: (1) carbon; and (2) black pigment. In embodiments, the substantially dark substrate is substantially homogeneous and the light emitting particles are integrated into the substantially dark substrate by being dispersed in the substantially dark substrate. In embodiments, the substantially dark substrate comprises: (1) at least one visible light absorbing layer configured to substantially absorb visible light; and (2) at least one fluorescent layer comprising the light emitting particles.

In embodiments, the substantially dark substrate comprises at least one anti-reflective layer. In embodiments, the at least one anti-reflective layer is an ultraviolet anti-reflective layer. In embodiments, the at least one visible light absorbing layer is between the at least one anti-reflective layer and the at least one fluorescent layer. In embodiments, the apparatus is comprised in a rear projection display. In embodiments, the at least one anti-reflective layer is a broadband anti-reflective layer. In embodiments, the broadband anti-reflective layer is configured to be anti-reflective for both visible light and ultraviolet light; and the at least one fluorescent layer is between the at least one visible light absorbing layer and the broadband anti-reflective layer.

In embodiments, the broadband anti-reflective layer has internal anti-reflective properties and a smooth surface. In embodiments, the apparatus is comprised in a front projection display. In embodiments, the broadband anti-reflective layer has anti-reflective surface properties. In embodiments, the apparatus is comprised in a rear projection display.

In embodiments, the substantially dark substrate comprises at least one waveband selective reflective layer. In embodiments, the at least one waveband selective reflective layer is between the at least one visible light absorbing layer and the at least one fluorescent layer. In embodiments, the apparatus is comprised in a front projection display.

In embodiments, the at least one fluorescent layer is between the at least one waveband selective reflective layer and the at least one light absorbing layer. In embodiments, the apparatus is comprised in a rear projection display.

In embodiments, the at least one waveband selective reflective layer is configured to selectively enhance visible light emission from the substantially dark substrate compensating for different visible light emissions of different visible colors emitted from the light emitting material. In embodiments, the at least one waveband selective reflective layer is a multilayer dielectric reflector.

In embodiments, the at least one waveband selective reflective layer is configured to reflect at least one band of visible light. In embodiments: (1) the waveband selective reflective layer is configured to reflect a first band of visible light and a second band of visible light; (2) the first band of visible light and the second band of visible light are different; and (3) the first band of visible light and the second band of visible light are reflected with different intensities.

In embodiments, the at least one waveband selective reflective layer is configured to reflect at least one band of ultraviolet light. In embodiments: (1) the waveband selective reflective layer is configured to reflect a first band of ultraviolet light and a second band of ultraviolet light; (2) the first band of ultraviolet light and the second band of ultraviolet light are different; and (3) the first band of ultraviolet light and the second band of ultraviolet light are reflected with different intensities.

In embodiments: (1) the substantially dark substrate comprises at least one selective visible light reflective layer and at least one selective ultraviolet light reflective layer; (2) the at least one selective visible light reflective layer is between the at least one selective visible light absorbing layer and the at least one fluorescent layer; (3) the at least one fluorescent layer is between at least one selective visible light reflective layer and the at least one selective ultraviolet light reflective layer; and (4) the apparatus is comprised in a rear projection display.

In embodiments, the at least one selective visible light reflective layer and the at least one selective ultraviolet light reflective layer are configured to selectively enhance visible light emission from the substantially dark substrate compensating for different visible light emissions of different visible colors emitted from the light emitting material. In embodiments, the light emitting material is fluorescent material. In embodiments, each of the plurality of light emitting particles has a diameter less than about 400 nanometers. In embodiments, each of the plurality of light emitting particles has a diameter less than about 100 nanometers. In embodiments, each of the plurality of light emitting particles is an individual molecule.

In embodiments, at least one of: (1) the plurality of light emitting particles which emit red light comprise Europium; (2) the plurality of light emitting particles which emit green light comprise Terbium; (3) the plurality of light emitting particles which emit blue light or yellow light comprise Cerium; (4) the plurality of light emitting particles which emit blue light comprise Erbium; and (5) the plurality of light emitting particles which emit blue light are comprised in an organic fluorescent dye.

In embodiments, wherein the light emitting material comprises: (1) a first material configured to emit a first visible color in response to absorption of a first bandwidth of ultraviolet light; and (2) a second material configured to emit a second visible color in response to absorption of a second bandwidth of ultraviolet light, wherein the second visible color is different from the first visible color. In embodiments, the first bandwidth of ultraviolet light and the second bandwidth of ultraviolet light are different. In embodiments, the first bandwidth of ultraviolet light and the second bandwidth of ultraviolet light are within the range of about 0 nanometers to about 480 nanometers. In embodiments, the first bandwidth of ultraviolet light and the second bandwidth of ultraviolet light are within the range of about 190 nanometers to about 460 nanometers. In embodiments, the first bandwidth of ultraviolet light and the second bandwidth of ultraviolet light are within the range of about 300 nanometers to about 420 nanometers.

In embodiments, the light emitting material comprises a third material configured to emit a third visible color in response to absorption of a third bandwidth of ultraviolet light, wherein the third visible color is different from the first visible color and the second visible color. In embodiments, the first visible color, the second visible color, and the third visible color are primary colors.

The foregoing embodiments (e.g. light emitting material integrated into a substantially dark substrate) and advantages are merely examples and are not to be construed as limiting the appended claims. The above teachings can be applied to other apparatuses and methods, as would be appreciated by one of ordinary skill in the art. Many alternatives, modifications, and variations will be apparent to those skilled in the art.

What is claimed is:

1. An apparatus comprising light emitting material integrated into a substantially dark substrate, wherein:
   the light emitting material is configured to emit visible light in response to absorption of ultraviolet light, wherein the light emitting material is fluorescent material;
   the light emitting material comprises a plurality of light emitting particles; and
   each of the plurality of light emitting particles has a diameter less than about 500 nanometers.

2. The apparatus of claim 1, wherein the apparatus is comprised in a rear projection display.

3. The apparatus of claim 1, wherein the apparatus is comprised in a front projection display.

4. The apparatus of claim 1, wherein:
   the apparatus is configured to receive ultraviolet light from a light source; and
   the light source is at least one of a DLP projector, an array of ultraviolet LEDs, and an ultraviolet laser projection scanner.

5. The apparatus of claim 1, wherein the substantially dark substrate is configured to be transparent to ultraviolet light.

6. The apparatus of claim 5, wherein the substantially dark substrate comprises at least one of:
a polarization filter;
a single layer band-pass filter; and
particles configured to selectively absorb visible light based on energy band properties.

7. The apparatus of claim 1, wherein the substantially dark substrate comprises at least one of:
carbon; and
black pigment.

8. The apparatus of claim 1, wherein the substantially dark substrate is substantially homogeneous and the light emitting particles are integrated into the substantially dark substrate by being dispersed in the substantially dark substrate.

9. The apparatus of claim 1, wherein the substantially dark substrate comprises:
at least one visible light absorbing layer configured to substantially absorb visible light; and
at least one fluorescent layer comprising the light emitting particles.

10. The apparatus of claim 9, wherein the substantially dark substrate comprises at least one anti-reflective layer.

11. The apparatus of claim 10, wherein the at least one anti-reflective layer is an ultraviolet anti-reflective layer.

12. The apparatus of claim 11, wherein the at least one visible light absorbing layer is between the at least one anti-reflective layer and the at least one fluorescent layer.

13. The apparatus of claim 12, wherein the apparatus is comprised in a rear projection display.

14. The apparatus of claim 10, wherein the at least one anti-reflective layer is a broadband anti-reflective layer.

15. The apparatus of claim 14, wherein:
the broadband anti-reflective layer is configured to be anti-reflective for both visible light and ultraviolet light; and
the at least one fluorescent layer is between the at least one visible light absorbing layer and the broadband anti-reflective layer.

16. The apparatus of claim 14, wherein the broadband anti-reflective layer has internal anti-reflective properties and a smooth surface.

17. The apparatus of claim 16, wherein the apparatus is comprised in a front projection display.

18. The apparatus of claim 14, wherein the broadband anti-reflective layer has anti-reflective surface properties.

19. The apparatus of claim 18, wherein the apparatus is comprised in a rear projection display.

20. The apparatus of claim 9, wherein the substantially dark substrate comprises at least one waveband selective reflective layer.

21. The apparatus of claim 20, wherein the at least one waveband selective reflective layer is between the at least one visible light absorbing layer and the at least one fluorescent layer.

22. The apparatus of claim 21, wherein the apparatus is comprised in a front projection display.

23. The apparatus of claim 20, wherein the at least one fluorescent layer is between the at least one waveband selective reflective layer and the at least one light absorbing layer.

24. The apparatus of claim 23, wherein the apparatus is comprised in a rear projection display.

25. The apparatus of claim 20, wherein the at least one waveband selective reflective layer is configured to selectively enhance visible light emission from the substantially dark substrate compensating for different visible light emissions of different visible colors emitted from the light emitting material.

26. The apparatus of claim 20, wherein the at least one waveband selective reflective layer is a multilayer dielectric reflector.

27. The apparatus of claim 20, wherein the at least one waveband selective reflective layer is configured to reflect at least one band of visible light.

28. The apparatus of claim 27, wherein:
the waveband selective reflective layer is configured to reflect a first band of visible light and a second band of visible light;
the first band of visible light and the second band of visible light are different; and
the first band of visible light and the second band of visible light are reflected with different intensities.

29. The apparatus of claim 20, wherein the at least one waveband selective reflective layer is configured to reflect at least one band of ultraviolet light.

30. The apparatus of claim 29, wherein:
the waveband selective reflective layer is configured to reflect a first band of ultraviolet light and a second band of ultraviolet light;
the first band of ultraviolet light and the second band of ultraviolet light are different; and
the first band of ultraviolet light and the second band of ultraviolet light are reflected with different intensities.

31. The apparatus of claim 9, wherein:
the substantially dark substrate comprises at least one selective visible light reflective layer and at least one selective ultraviolet light reflective layer;
the at least one selective visible light reflective layer is between the at least one selective visible light absorbing layer and the at least one fluorescent layer;
the at least one fluorescent layer is between at least one selective visible light reflective layer and the at least one selective ultraviolet light reflective layer; and
the apparatus is comprised in a rear projection display.

32. The apparatus of claim 31, wherein the at least one selective visible light reflective layer and the at least one selective ultraviolet light reflective layer are configured to selectively enhance visible light emission from the substantially dark substrate compensating for different visible light emissions of different visible colors emitted from the light emitting material.

33. The apparatus of claim 1, wherein each of the plurality of light emitting particles has a diameter less than about 400 nanometers.

34. The apparatus of claim 33, wherein each of the plurality of light emitting particles has a diameter less than about 100 nanometers.

35. The apparatus of claim 1, wherein each of the plurality of light emitting particles is an individual molecule.

36. The apparatus of claim 1, wherein at least one of:
the plurality of light emitting particles which emit red light comprise Europium;
the plurality of light emitting particles which emit green light comprise Terbium;
the plurality of light emitting particles which emit blue light or yellow light comprise Cerium;
the plurality of light emitting particles which emit blue light comprise Erbium; and
the plurality of light emitting particles which emit blue light are comprised in an organic fluorescent dye.

37. The apparatus of claim 1, wherein the light emitting material comprises:

a first material configured to emit a first visible color in response to absorption of a first bandwidth of ultraviolet light; and a second material configured to emit a second visible color in response to absorption of a second bandwidth of ultraviolet light, wherein the second visible color is different from the first visible color.

38. The apparatus of claim 37, wherein the first bandwidth of ultraviolet light and the second bandwidth of ultraviolet light are different.

39. The apparatus of claim 37, wherein the first bandwidth of ultraviolet light and the second bandwidth of ultraviolet light are within the range of about 0 nanometers to about 480 nanometers.

40. The apparatus of claim 39, wherein the first bandwidth of ultraviolet light and the second bandwidth of ultraviolet light are within the range of about 190 nanometers to about 460 nanometers.

41. The apparatus of claim 40, wherein the first bandwidth of ultraviolet light and the second bandwidth of ultraviolet light are within the range of about 300 nanometers to about 420 nanometers.

42. The apparatus of claim 37, wherein the light emitting material comprises a third material configured to emit a third visible color in response to absorption of a third bandwidth of ultraviolet light, wherein the third visible color is different from the first visible color and the second visible color.

43. The apparatus of claim 42, wherein the first visible color, the second visible color, and the third visible color are primary colors.

44. A method comprising emitting visible light from light emitting material in response to absorption of ultraviolet light, wherein:

the light emitting material is integrated into a substantially dark substrate;

the light emitting material comprises a plurality of light emitting particles; and each of the plurality of light emitting particles has a diameter less than about 500 nanometers.

* * * * *